United States Patent
Van der Meulen

(10) Patent No.: US 6,904,004 B1
(45) Date of Patent: Jun. 7, 2005

(54) AUDIO SYSTEM WITH VARIABLE RANDOM-PLAY OPTION

(75) Inventor: Pieter Sierd Van der Meulen, Sunnyvale, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 1023 days.

(21) Appl. No.: 09/685,554

(22) Filed: Oct. 10, 2000

(51) Int. Cl.[7] .............................................. G11B 17/22
(52) U.S. Cl. .................. 369/30.28; 369/30.06
(58) Field of Search .................... 369/30.06, 30.26, 369/30.08, 30.64, 30.28, 30.2, 30.29, 34.01, 30.09, 30.27; 707/104.1; 704/270.1

(56) References Cited

U.S. PATENT DOCUMENTS

| | | | |
|---|---|---|---|
| 4,841,506 A | 6/1989 | Kiyoura | |
| 4,899,331 A | 2/1990 | Masaki | |
| 4,922,476 A | 5/1990 | Kiyoura | |
| 4,949,322 A | 8/1990 | Kimura | |
| 5,408,448 A | 4/1995 | Carman | |
| 5,543,925 A | 8/1996 | Timmermans | |
| 5,884,282 A | 3/1999 | Robinson | |
| 6,031,797 A | 2/2000 | Van Ryzin et al. | |
| 6,034,925 A * | 3/2000 | Wehmeyer | 369/30.28 |
| 6,226,235 B1 * | 5/2001 | Wehmeyer | 707/104.1 |
| 6,388,958 B1 * | 5/2002 | Yankowski | 369/30.06 |
| 6,519,564 B1 * | 2/2003 | Hoffberg et al. | 704/270.1 |
| 6,563,769 B1 * | 5/2003 | Van Der Meulen | 369/30.06 |

FOREIGN PATENT DOCUMENTS

| | | |
|---|---|---|
| DE | 19701057 | 8/1998 |
| DE | 19904007 | 8/2000 |

* cited by examiner

Primary Examiner—Ali Neyzari
(74) Attorney, Agent, or Firm—Edward W. Goodman

(57) ABSTRACT

A video or audio play-back apparatus has a variable random play option to control a degree of randomnees of the selections made from a play list.

7 Claims, 1 Drawing Sheet

AUDIO SYSTEM WITH VARIABLE RANDOM-PLAY OPTION

FIELD OF THE INVENTION

The invention relates to a system and method for play-out of audio or video content using a random-play-option.

BACKGROUND ART

Conventional CD players and jukeboxes allow users to specify their Favorite Track Selections (FTS) and play-lists, and typically also have a random-play option (RPO). The FTS option lets the user pre-select his/her favorites and enables to play-out these tracks only. The RPO is an operational mode of the apparatus wherein tracks are being selected and played in a varying, non-sequential order. Selection in the random-play mode is achieved through, e.g., a random number generator. Examples and implementations of random-play control circuitry are discussed in, e.g., U.S. Pat. No. 5,543,925 (Philips), U.S. Pat. No. 4,841,506 (Pioneer); U.S. Pat. No. 4,899,331 (Pioneer); U.S. Pat. No. 4,922,476 (pioneer); U.S. Pat. No. 4,949,322 (pioneer) and U.S. Pat. No. 5,408,448 (Delco Electronics Corporation), all incorporated herein by reference.

SUMMARY OF THE INVENTION

The RPO operates on a pre-determined play-list, typically the list consisting of the entire inventory currently accessible in the apparatus, e.g., the inventory of tracks of a CD. On the other hand, many songs in the music collection never get played anymore in the FTS mode, even though the user might occasionally like to hear a "non-favorite".

Accordingly, the inventor proposes a variable RPO in CE play-out equipment using a random-access content inventory, such as a CD player, an audio CD jukebox, an MP3 player, a DVD library, etc. The invention provides a hardware or software knob, dial or slider on the equipment that lets the user specify a certain amount of flexibility for the equipment to randomly or systematically play out content segments or tracks in addition to those of the FTS. For example, the knob covers a range 0–100%. A 10% setting allows the machine to add one randomly chosen track that is not on favorite track list, to the current play-out list after playing out 10 favorites. A 50% setting allows every other track to be chosen from the entire selection. A 100% setting represents the traditional fully random play mode. The selection can be based on a purely random selection, or on a knowledge base ("IF YOU LIKE THIS, YOU PROBABLY ARE GOING TO LIKE THIS TOO."). In the latter case, the knowledge base can reside on the user's home network as his/her profile or on a remote server possibly on the Web.

More generally, the invention relates to equipment, typically CE equipment, for playing out audio or video content, pre-recorded, live, or a mix thereof. The equipment has a user-variable random-play option for control of the playing out to allow a user to determine a frequency of random selection from among the content. Preferably, the equipment allows the user to indicate selections from the content; and the frequency is chosen with respect to playing out the selections. The selections can be identified based on a user-profile. The invention also relates to a method of enabling playing out pre-recorded content. The method allows a user to determine a frequency of random selection from among the content for control of the playing out.

The invention can be implemented using a client-server architecture. A server on, e.g., the Internet supplies streamable content such as personalized video or audio programs based on, e.g., the user's profile. A frequency of randomly chosen programs can be set by the user, for example to create a personalized Electronic Program Guide (EPG), wherein programs of pre-specified or user-profiled topics are alternated with programs randomly chosen from one or more or all other categories to fill up the EPG.

The expression "random selection" as used herein is meant to cover "genuinely random" as well as "pseudo-random" and "substantially random" to indicate any mechanism that is perceived by the user to select content in an unbiased manner from a larger collection.

Incorporated herein by reference are the following patent documents:

U.S. Ser. No. 09/568,932 filed May 11, 2000 for Eugene Shteyn and Ruud Roth for ELECTRONIC CONTENT GUIDE RENDERS CONTENT RESOURCES TRANSPARENT. This document relates to a data management system on a home network. The system collects data that is descriptive of content information available at various resources on the network. The data is combined in a single menu to enable the user to select from the content, regardless of the resource. In a more specific example, the data management system combines the data of an EPG with other data for other types of content information, typically within the context of a home entertainment system. The system comprises a data base for representing schedule information associated with scheduled content information from a content provider such as a broadcasting station or a video-on-demand (VOD) service. In addition, the data base also represents inventory information that is associated with content information available from another resource, e.g., as recorded at the consumer's digital Personal TV Receiver during previous broadcasts, or from a CD or DVD jukebox. Accordingly, this document relates to a general type of guide, referred to as an electronic content guide (ECG).

U.S. Ser. No. 09/326,506 filed Jun. 4, 1999 for Pieter van der Meulen for VIRTUAL JUKEBOX. This document relates to a collection management system, or virtual jukebox, for a collection of recordings that is independent of the physical media upon which the material is recorded. The system forms a part of a network that includes storage media and playback devices, and provides an easy to use system for collection cataloging, archiving, and retrieval. In a preferred embodiment, a collection management, system resides on a consumer electronic (CE) device, or a personal or home computer (PC), and the collection includes recordings that are stored on one or more hard drives associated with the CE device or the PC. The collection management system includes a user interface that facilitates the retrieval of recordings for playback from one or more storage devices, based on an individual selection of genre, author, and so on. By storing the recordings on a hard disc drive or other mass storage device with an associated disk operating system, immediate access is available to each recording on the drive, and additional drives can be added to the system as new material is added to the collection.

U.S. Ser. No. 09/345,339 filed Jul. 1, 1999 for Mark Hoffberg and Eugene Shteyn for CONTENT-DRIVEN SPEECH- OR AUDIO-BROWSER. This document relates to categorizing resources on the Internet. The Internet is searched in order to find resources that provide streamable audio such as live Internet broadcasts. The resources are identified based on their file extension and are categorized according to, e.g., the natural language or music style. The user is enabled to browse the collection based on textual or musical input.

BRIEF DESCRIPTION OF THE DRAWING

The invention is further explained below, by way of example and with reference to the accompanying drawing, wherein.

DETAILED EMBODIMENTS

Figure 1:
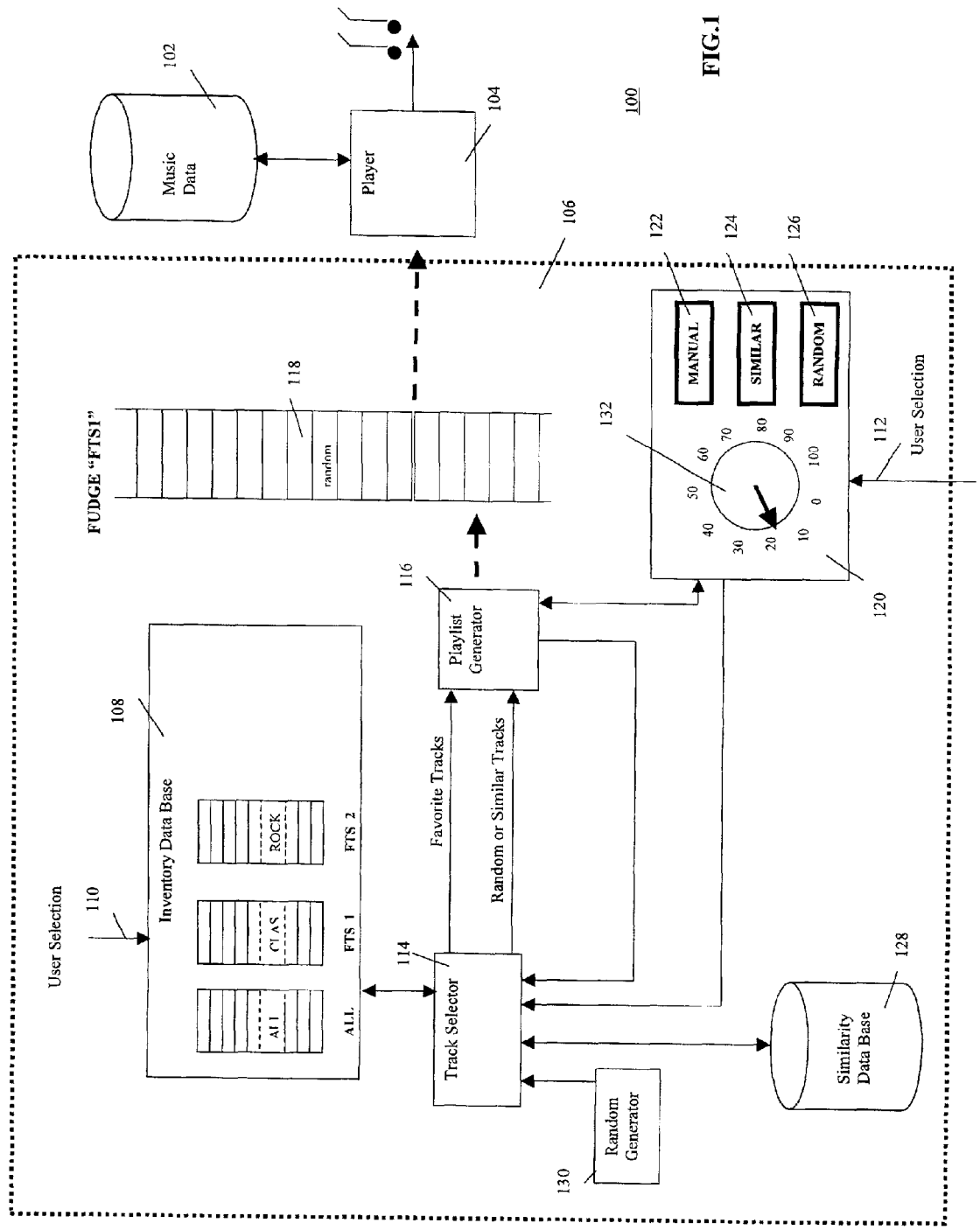
FIG. 1 is a block diagram of a system in the invention.

FIG. 1 is a block diagram of a system 100 in the invention. System 100 in this example comprises an audio system that allows selection of music tracks for play out. System 100 comprises a music data base 102, a play-out component 104, and a control system 106 for enabling the user to control a selection of tracks from data base 102, their order for play-out and the play-out mode via component 104. System 106 has a categorized inventory 108 of tracks available to this user. Inventory 108 has categorized the tracks according to, e.g., favorites per genre, and also has an index of all available tracks. Inventory 108 comprises pointers to a sub-set or to all items available in data base 102. The user can provide user-input 110 and 112 to system 106 to select which tracks to play and in what mode. System 106 comprises a track selector 114 that selects the tracks from inventory 108 based on one or more criteria as specified by user input 110 and 112. Selector 114 controls a play-list generator 116 that creates a play-list 118. Play list 118 determines which tracks are selected from data base 102 for being played out by play-out component 104.

Track selector 114 receives an input from a user-interface (UI) 120 that lets the user specify a mode of operation. In this example, UI 120 has options 122, 124 and 126 accessible through, e.g., hard buttons.

Option 122 lets the user activate a play list manually prepared by the user in advance. This option 122 requires that the user have made a manual selection from inventory 108, e.g., via input 110.

Option 124 lets the user control selector 114 to find tracks similar, but not necessarily identical, to the ones in a current play-list. To this end, system 106 has a look-up table or similarity data base 128. For example, CD titles or albums have been categorized as "classical", "romance", "hard-rock", etc. If a classical favorite track list is selected other music categorized as "classical" can be inserted randomly as similar. If system 100 is implemented as a client-server architecture with a remote server on the Internet, system 100 has access to data bases that have been generated by collaborative filtering. These data bases comprise personal recommendations generated by determining a degree of similarity between a user's preferences and that of other people. See, e.g., U.S. Pat. No. 5,884,282, herein incorporated by reference. This document relates to an automated collaborative filtering system for recommending at least one item to a first user based on similarity in preference of the user as compared with other users. The filtering system stores rating data for items provided by users of the system. Upon request of the first user, the system determines similarity values for the first user as compared with other users that have provided rating data for items that the first user has also rated. Based on the similarity values, a subgroup of users is selected that is then used to provide recommendations to the first user.

Option 126 controls the random-play mode. Selector 114 is coupled to a random generator 130 to randomize selection from inventory 108, or from a sub-set thereof. In the invention, the degree of randomness is made variable through a user input 132, here referred to as a fudge knob. Given a current play list 118, the user can introduce a degree of randomness through fudge knob 132. When knob 132 is turned to the "100%" mark, current play list 118 is replaced by a fully random selection from inventory 108, or a from specified sub-set, under control of generator 130. If knob 132 is turned to "0%" play list 118 is processed unaltered. If knob 132 is set to a value in-between, play-list 118 is modified accordingly. The result is that player 104 plays randomly chosen tracks and pre-specified tracks at a ratio represented by the value indicated by the position of fudge knob 132.

System 100 is for example accommodated in single apparatus, or forms a cluster of apparatus in the home. Alternatively, system 100 is a distributed system, e.g., a client-server architecture, wherein the user has play-out device 104 with UI functionalities 120 and 108, and wherein the actual preparation of the play-list and the supply of the music done via a remote server or a cluster of cooperating remote servers, streamed in real time or downloaded in advance to the user's client hard-disk drive (HDD). In the latter case, the selection is performed on the inventory residing on the HDD.

What is claimed is:

1. An information processing system for making content information available to a user and for allowing the user to determine a degree of random selection from among the content information, said system comprising:

a database for providing access to a plurality of content information;

a player for selecting from said database and rendering various of said content information; and a controller for enabling a user to control a selection of content information from said database to be selected and rendered by said player, said controller comprising:

a inventory listing the content information available on said database;

a track selector for generating a playlist of various of said content information from said inventory for application of said playlist to said player;

a random generator coupled to said track selector for selectively causing said track selector to generate said playlist by randomly selecting content information from said inventory; and a user interface for enabling a user to control said track selector, said user interface having a variable random control for controlling an amount of randomness of randomly selected content information in forming said playlist, said variable random control having a first position in which the track selector selects the content information from the inventory to form the playlist in the order in which the list of content information is stored in the inventory, a last position in which the track selector selects the content information from the inventory to form the playlist in a random order under control of the random generator, and at least one intermediate position in which the track selector selects the content information from the inventory to form the playlist partly according to the random generator and partly in the order in which said list is stored.

2. The information processing system as claimed in claim 1, wherein:

the controller, through the user interface, allows the user to indicate a plurality of sections from the content; and the variable randomness control controls the randomness with respect to the indicated selections.

3. The information processing system as claimed in claim 1, wherein said information processing system comprises an audio jukebox.

4. The information processing system of claim 1, wherein said information processing system is implemented in a client-server architecture, wherein preparing the selection is performed on a remote server under control of the user interacting with the client.

5. The information processing system as claimed in claim 1, wherein said information processing system is implemented in a client-server architecture, wherein preparing the selection is performed on the content information downloaded from a remote server onto a user's client.

6. A method of enabling to supply content information to a user, wherein the method allows the user to vary a degree of random selection from among the content information, said method comprising the steps of:

provproviding access to a plurality of content information;

selecting from said database and rendering various of said content information; and enabling a user to control a selection of content information from said database to be selected and rendered by said player, wherein said enabling step comprises the sub-steps:

generating a listing of the plurality of content information;

generating a playlist of various of said content information from said listing, said generating being performed randomly; and controlling an amount of randomness of said playlist generating step, said controlling having predetermined range in which at a first end of said range, said playlist generating step generates the playlist from the listing in the order in which the listing is formed, at a last end of said range, said playlist generating step generates the playlist from the listing in a random order, and at at least one intermediate position in the range, said playlist generating step generates the playlist partly in a random order and partly in the order in which said listing is formed.

7. A software program for installing on an information processing system, said software program enabling the information processing system to select content information from a database and allow a user to vary a degree of random selection from among the content information, wherein said software program causes the information processing system to perform the steps:

selecting from said database and rendering various of said content information; and enabling a user to control a selection of content information from said database to be selected and rendered by said player, wherein said enabling step comprises the sub-steps:

generating a listing of the plurality of content information;

generating a playlist of various of said content information from said listing, said generating being performed randomly; and controlling an amount of randomness of said playlist generating step, said controlling having predetermined range in which at a first end of said range, said playlist generating step generates the playlist from the listing in the order in which the listing is formed, at a last end of said range, said playlist generating step generates the playlist from the listing in a random order, and at at least one intermediate position in the range, said playlist generating step generates the playlist partly in a random order and partly in the order in which said listing is formed.

\* \* \* \* \*